US012686636B2

(12) United States Patent
Niroumand et al.

(10) Patent No.: US 12,686,636 B2
(45) Date of Patent: Jul. 21, 2026

(54) METHOD OF PRODUCTION AND USE OF A NANO-REGOLITH FOR PREPARING A CONSTRUCTION MATERIAL FOR EXTRATERRESTIAL PURPOSES

(71) Applicants: Hamed Niroumand, Tehran (IR); Lech Bałachowski, Gdansk (PL)

(72) Inventors: Hamed Niroumand, Tehran (IR); Lech Bałachowski, Gdansk (PL)

( * ) Notice: Subject to any disclaimer, the term of this patent is extended or adjusted under 35 U.S.C. 154(b) by 484 days.

(21) Appl. No.: 18/207,667

(22) Filed: Jun. 8, 2023

(65) Prior Publication Data

US 2024/0400450 A1 Dec. 5, 2024

Related U.S. Application Data

(60) Provisional application No. 63/471,251, filed on Jun. 5, 2023.

(51) Int. Cl.
*C04B 14/36* (2006.01)
*B02C 17/00* (2006.01)
(Continued)

(52) U.S. Cl.
CPC .............. *C04B 14/36* (2013.01); *B02C 17/00* (2013.01); *C04B 20/026* (2013.01); *C04B 28/006* (2013.01)

(58) Field of Classification Search
CPC ..... C04B 28/006; C04B 20/026; C04B 14/36; C04B 14/361
See application file for complete search history.

(56) References Cited

U.S. PATENT DOCUMENTS 10,703,958 B2 * 7/2020 Chatterji ................. E21B 33/13
2014/0209515 A1 7/2014 Walton et al.
(Continued)

FOREIGN PATENT DOCUMENTS

CN 110405903 A 11/2019
RU 2682962 C1 * 3/2019 ............... B64G 1/00

OTHER PUBLICATIONS

3D Printing and Solvent Dissolution Recycling of Polylactide-Lunar Regolith Composites by Material Extrusion Approach.*
(Continued)

*Primary Examiner* — Bobby Yeonjin Kim
(74) *Attorney, Agent, or Firm* — Andrzej Malarz, Esq.

(57) ABSTRACT

A use of nano-regolith for preparing a construction material, wherein the particle size of the nano-regolith is between 2 nm and 100 nm and a method for production of a modified regolith powder, comprising the steps of: a) acquiring a batch regolith, b) forming the modified regolith powder with an average particle size of between 2 nm and 100 nm, wherein forming the modified regolith powder is performed by grinding the batch regolith in a rotating ball mill, wherein the ball mill includes a plurality of mill balls, wherein the average particle size of the modified regolith powder produced is between 2 nm and 100 nm, and a method for production of a modified regolith suspension, comprising the steps of: a) acquiring a batch regolith, b) forming the modified regolith powder with an average particle size of between 2 nm and 100 nm, wherein forming the modified regolith powder is performed by grinding the batch regolith in a rotating ball mill, wherein the ball mill includes a plurality of mill balls, wherein the average particle size of the modified regolith powder produced is between 2 nm and 100 nm. c) forming a suspension of the modified regolith powder d) placing the suspension of the modified regolith
(Continued)

powder in an ultrasonic liquid bath for 5-30 min to disperse the modified regolith powder for geochemical fractionation.

9 Claims, 3 Drawing Sheets

(51) Int. Cl.
 *C04B 20/02* (2006.01)
 *C04B 28/00* (2006.01)

(56) References Cited

U.S. PATENT DOCUMENTS

| | | | |
|---|---|---|---|
| 2022/0315497 A1* | 10/2022 | Metzger ................... | E21C 51/00 |
| 2023/0131327 A1* | 4/2023 | Pal ........................... | C25C 7/005 |
| | | | 205/635 |

OTHER PUBLICATIONS

Translation of RU-2682962.*

* cited by examiner

A

M

G

B

B

B

A

METHOD OF PRODUCTION AND USE OF A NANO-REGOLITH FOR PREPARING A CONSTRUCTION MATERIAL FOR EXTRATERRESTIAL PURPOSES

BACKGROUND OF THE INVENTION

Field of the Invention

The present disclosure generally relates to materials engineering, and more particularly to a use of a nano-regolith powder, suspension and spray as a construction material in an extraterrestrial environment, such as Space, Moon, Mars, and others, and a production method thereof.

BRIEF DESCRIPTION OF THE BACKGROUND OF THE INVENTION INCLUDING PRIOR ART

As space exploration becomes a dominant scientific and technological goal worldwide, many challenges appear, many of which relate to simple and durable construction solutions applied on-site at the extraterrestrial body, for example Moon or Mars.

Since large-scale transport of the construction materials outside the Earth's surface and orbit poses a significant economical challenge, other solutions are begin seek, such as using the on-site materials available on the extraterrestrial body.

CN110405903A discloses lunar regolith concrete suitable for being extruded and a preparation method thereof. The lunar soil "concrete" suitable for extrusion is characterized in that the "concrete" of the lunar soil includes a lunar soil mimic, calcium silicate and water; and the calcium silicate is calculated by using the mass of the lunar soil simulant as 100 parts. The parts by mass are 45-46 parts, and the parts by mass of water are 54-55 parts. However, the relatively high particle size of 10-100 μm may limit the mechanical and chemical properties of the material for a construction use or may require additional additives or significant amount of water to provide sufficient mechanical strength, which additionally increase the curing time of the structure.

US2014209515A1 discloses a blended regolith simulant material comprising: one part by volume of original regolith simulant material to N parts by volume of a low-density fine particulate material additive, where N is generally greater than one less than the ratio of the gravitational acceleration on the surface of the earth to the gravitational acceleration on the surface of a target extraterrestrial body and generally lies in the range obtained from the formula $(F-1)-N \leq p$ s $(F-1)/(p$ s$-Fp$ b$)$, where F is the ratio of gravitational acceleration on earth to that on the target extraterrestrial body, p s is the bulk density of original regolith simulant material, and p b is the bulk density of the low-density fine particulate additive. Since the material disclosed requires additional low-density fine particulate additive, the material production process becomes dependent on an external material source, which may be a challenge to long-term maintain at low cost.

RU2718548C1 discloses a method of constructing a dome structure on the Moon, including installing an inflatable dome, organizing a protective shell, characterized in that the protective shell is carried out by continuous layering around the dome over its entire height and width of layers of flexible elements in the form of an elastic polymer tow by a wheeled robot-manipulator that moves around the dome along the track. The document also discloses feeding the lunar soil with regolith by a robotic arm moreover, the regolith soil comes from a mobile automatic storage station. As the precise particle size of the particles of the regolith is not specified, the technological effect may vastly vary between uses of different particle sizes, and thus the overall construction stability of the structure may depend on the precise selection of the properties of the materials.

As explained above, there is a need for a construction material available on-site at the extraterrestrial body for construction purposes, providing expectable and repeatable results, while also not needing any additional additives to achieve such properties as well as not needing or needing a minimum amount of water in its composition, which is scarce in such environments, as well as a production method allowing a simple and high-quality production of the said material on-site.

SUMMARY OF THE INVENTION

Purposes of the Invention

It is an object of the present invention to provide a solution to the above mentioned problems, namely to provide a material characterized by specific properties which can be measured by identification tests (such as SEM, XED and XRF) which are optimal to a wide range of engineering extraterrestrial uses as well as a production method for preparing the nano-regolith powder as a building material. Regolith is most commonly considered a layer of unconsolidated, loose, heterogeneous superficial deposits covering solid rock. It includes dust, broken rocks, and other related materials and is present on Earth, the Moon, Mars, some asteroids, and other cellestial bodies. In the method of production the nano-regolith, a particles of any type of regolith may be converted from centimeter or millimeter dimensions to nano dimensions and then according justification and optimal use of the nano-regolith, it may be used for engineering and scientific parameters of related applications. The nano-regolith, in this description also called a modified regolith powder or a powder, can be used to prepare a suspension of the powder in a water or with a geopolymer, or a mixture of the powder, the water and other raw material available on-site, hereinafter also called a "spray". The possible use of a modified regolith powder, suspension and spray are vast and include many construction projects which may be developed on-site at the extraterrestrial body needed for a manned or unmanned space exploration project, such as housing units, industrial facilities, infrastructure elements such as roads, canals, ground reinforcements, radiation shields, storage warehouses and other industrial groundworks applications like ground stabilization. The nano-regolith may be used in a 3D-printing construction system to further facilitate and speed up the construction project objects such as the ones mentioned above. The particle size of the primary regolith (batch regolith) may determine the degree of purity, the shape of the material particles, and the degree of quality of the material. Nanomaterials as granular matter are called nanopowders. In this case, their grain size may be in the range of 1 to 100 nanometers in one dimension or in three dimensions. The existing design uses a "top-down" approach as a method for production of nano-additives to fabricate the nano-materials. Ball milling is more important due to its access and simple production process, higher nanoparticle production speed, cost-effectiveness, and implementation.

These and other objects and advantages of the present invention will become apparent from the detailed description, which follows.

BRIEF DESCRIPTION OF THE INVENTION

The object of the invention is to provide nano-regolith as a constituent for preparing a construction material. The particle size of the nano-regolith is preferably between 2 nm and 100 nm. Such a small particle size ensure high mechanical properties of the construction material, as it allows for a greater compaction of the particles during construction.

Another object of the invention is to provide a method for production of a modified regolith powder, in this description also called a nano-regolith, comprising the steps of:

a) acquiring a batch regolith, b) forming a modified regolith powder with an average particle size of between 2 nm and 100 nm, wherein forming the modified regolith powder is performed by grinding and/or crushing and/or shredding the batch regolith in a rotating ball mill, wherein the ball mill includes a plurality of mill balls, wherein the average particle size of at least 50% of the modified regolith powder produced is between 2 nm and 100 nm, preferably between 2 nm and 100 nm. The ball mill can be a regular ball mill as used on Earth or it can be modified for the extraterrestrial use. In particular it can be built of lightweight and/or durable materials like for example titanium. The ball mill can be set in motion by standard or special electrical motor powered by solar panels. The names "nano-regolith" or "modified regolith powder" used in this description means the regolith which average particles size as measured using a DLS or SEM method is below 100 nm, preferably below 100 nm. The nano-regolith or the nanomaterials may be used in either dry or suspension form. In previous studies, the effect of nanomaterials in both dry and water-suspendable form has been investigated and, according to the reports presented, the use of nanomaterials in the suspension has a better performance than the powder. When the particles are mechanically reduced to a smaller particles at the nanoscale, the energy level of the particles may be high due to their small size, so they may react quickly together. For the purpose of reference, it may be understood that this may cause the particles to agglomerate and form larger conglomerates.

In one embodiment, the step b) of forming the modified regolith powder is performed by grinding and/or crushing and/or shredding the batch regolith in a rotating ball mill, wherein the ball mill includes a plurality of mill balls, wherein the average particle size of the modified regolith powder produced in step b) is preferably between 2 nm and 100 nm, more preferably between 40 nm and 80 nm, and most preferably between 50 nm and 70 nm. The mill balls are metal or ceramic balls which are freely movable inside the ball mill chamber. While the ball mill chamber rotates, the mill balls hit the regolith particles, for example the particles of the regolith are hit and crushed between two or more mill balls or between the mill balls and the walls of the ball mill chamber. The size and weight as well as the number of the mill balls are selected experimentally. The conducted research indicated, that for reaching the best result of the required modified regolith powder particle sizes, very important is the weight ratio of the batch regolith to the weight of the plurality of the mill balls.

In one embodiment, the weight ratio of the batch regolith to the weight of the plurality of the mill balls is between 1:15 and 1:30 wt/wt, preferably between 1:18 and 1:27 wt/wt, more preferably between 1:21 and 1:24 wt/wt, and most preferably between 1:22 and 1:23 wt/wt, respectively.

In one embodiment, the ball mill is configured to rotate at a rotational speed between 600 rpm and 4200 rpm, preferably 1000 rpm and 3000 rpm, more preferably 1500 rpm and 2500 rpm, and most preferably 1800 rpm and 2200 rpm. The ball mill is not an object of the invention as such, however, any adjustable parameters of the ball mill, like for example the rotational speed, operation time or positioning of the rotation axes in space can be used in order to obtain the desired outcome parameters of the output product, namely the nano-regolith or the modified regolith powder.

Another object of the present invention is a method of production of a modified regolith suspension. The method comprises steps of: a) acquiring batch regolith, wherein the batch regolith includes any type of regolith available on the construction site, b) forming from the batch regolith obtained in step a) a modified regolith powder with an average particle size of between 2 nm and 100 nm, c) forming a suspension of the modified regolith powder, d) placing the suspension of the modified regolith powder in an ultrasonic liquid bath for 5-30 min to disperse the modified regolith powder for geochemical fractionation. The liquid used to form the suspension can be any type of applicable substance, such as water or a geopolymer. The choice of water suspension and/or geopolymer suspension depends on different applications. For example, water suspension can be used for low-strength applications and geopolymer suspension can be used for high-strength applications. However, geopolymer is better than water in general for this purpose. Water and geopolymer are two different substances that can be used for various applications. Water is a liquid that consists of hydrogen and oxygen atoms, while geopolymer is a solid material that consists of an amorphous aluminosilicate network. Water mainly provides a medium to facilitate the geopolymerization reaction, which is the process of forming geopolymers from aluminosilicate precursors and alkali activators. Geopolymer has some advantages over water for certain applications, such as fire resistance, chemical corrosion resistance, high mechanical strength, and low carbon dioxide emissions. However, water is not completely absent from geopolymers. Water is present only at temperatures below 150° C.-200° C. (302 degrees Fahrenheit-392 degrees Fahrenheit), essentially in the form of —OH groups, which are part of the geopolymer structure.

In one embodiment, step c) of forming the suspension of the modified regolith powder includes forming the suspension of the modified regolith powder with a weight ratio of the modified regolith powder to the water between 1:100 wt/wt and 18:100 wt/wt, preferably between 3:100 wt/wt and 15:100 wt/wt, more preferably between 6:100 wt/wt and 12:100 wt/wt, and most preferably between 8:100 wt/wt and 10:100 wt/wt, respectively.

In one embodiment, step c) of forming the suspension of the modified regolith powder includes mixing the modified regolith powder and the water in an ultrasonic homogenizer. The ultrasonic homogenizer is a powerful tool to mix and homogenize solid-liquid and liquid-liquid suspensions.

In one embodiment, the modified regolith powder and the water is mixed in the ultrasonic homogenizer for the period of time between 10 minutes and 45 minutes, preferably between 15 minutes and 40 minutes, more preferably between 20 minutes and 35 minutes, and most preferably between 25 minutes and 30 minutes.

In one embodiment, the liquid used to prepare the suspension is a geopolymer.

Regarding the spray method, the nano-regolith suspension is placed in a liquid bath (ultrasonic bath) for 5-30 min to disperse the nano-regolith for geochemical fractionation.

The sprinkling is performed with a spraying device for dispersing an enclosure with the suspension of the nano-regolith (spray mixture). The spraying device (not claimed) includes a reservoir for containing the suspension of the nano-regolith, a pump in fluid communication with the reservoir, and a movable spray head having an outlet orifice through which the suspension of the nano-regolith from the reservoir is expelled during operation of the pump if there is such the suspension of the nano-regolith in the reservoir. Said spraying device also contains an electrical motor drive mechanism for sequentially operating the pump and moving the spray head to modify the direction of the spray there from, such that the spray head is not simultaneously spraying and moving. The advantage of using the spraying device is uniformity in regolith soil mixing.

BRIEF DESCRIPTION OF THE DRAWINGS

These aims together with other objects and advantages which will become subsequently apparent reside in the details of the construction and operation as more fully hereinafter described and claimed, reference being made to the accompanying drawings forming a part hereof, wherein the same numerals refer to the same parts throughout.

In Drawings

DETAILED DESCRIPTION OF INVENTION AND PREFERRED EMBODIMENT

Figure 1A:
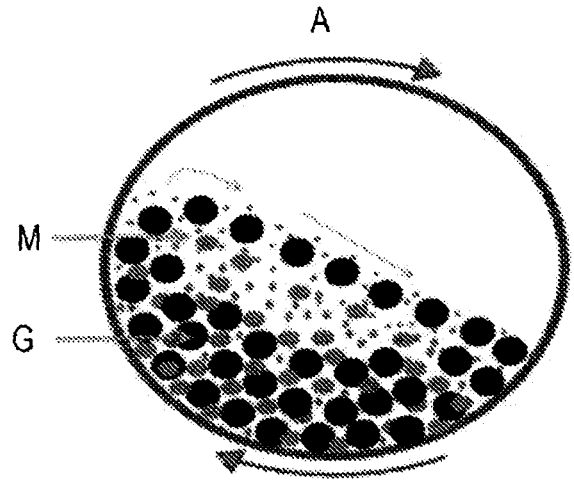
FIG. 1a illustrates schematically the work principle of the ball mill for the nano-regolith production.
Figure 1B:
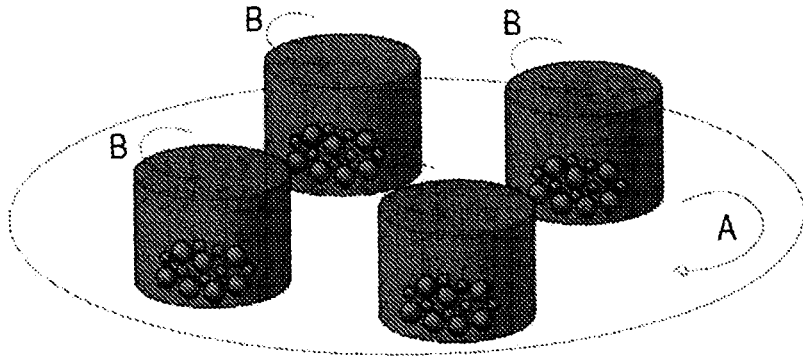
FIG. 1b illustrates schematically the work principle of another embodiment of the ball mill.

Referring to the drawing, FIG. 1a shows schematically a principle of operation of a ball mill (not claimed). The ball mills are well known, therefore the construction will be not described here in details. However, the material from which the ball mill for the extraterrestrial use is made is preferably titanium. It allows for much longer service life, is characterized by greater durability and reliability. The cost of the materials is not important in this case. The operating parameters of the ball mill, for example the size and material of the balls, the weight ratio of the balls to the batch regolith, rotational speed of the ball mill cylinder, inclination of the rotational axis, time of operating, etc, are changeable and are to be set according to the requirements of the output material (the nano-regolith). It can be seen on FIG. 1a that during operation, the ball mill cylinder rotates according to the direction of the arrow A. The crushing medium G, which includes a plurality of metal balls of sizes 1 cm, 1.5 cm and 2 cm, rotate inside the cylinder around an axis. The bottom plate of the device and the cylinders containing the material to be grinded and/or crushed and/or shredded which is the regolith powder (batch regolith, M) rotate around an axis perpendicular to each other in opposite directions (one clockwise and the other counterclockwise). These movements are creating a centrifugal force. The balls first are pressed to a wall of the cylinder due to the centrifugal force caused by the rotational motion of the chamber and then the centrifugal force caused by the rotational motion of the plate dominates the force and, the balls in the cylinder are falling on the batch regolith material particles in a specific position due to the gravity and are causing them to crush and ultimately convert the particles to nano size. The wording "nano size" or "nano-regolith" in this description means a size from around 5 nm to around 100 nm (nanometers). In simpler terms, these methods are among the methods in which by crushing and shredding larger materials and particles into smaller particles and continuing this process to the size of nanometers, they become nanoparticles, which means a particles with the average nano size as described above. The particle size of the primary powder of the batch regolith may determine the degree of purity, the shape of the material particles and the degree of quality of the material. Another construction of the ball mill (not claimed) is shown on FIG. 1b. This planetary ball mill includes a number of ball mill cylinders (grinding jars) which are rotatably placed on an independently rotatable base plate. The directions of rotation B of the grinding jars and the directions of rotation A of the base plate are opposite. The grinding balls in the grinding jars are subjected to superimposed rotational movements, the so-called Coriolis forces. The difference in speeds between the balls and grinding jars produces an interaction between the frictional and the impact forces, which releases high dynamic energies. The interplay between these forces produces the high and very effective degree of size reduction of the planetary ball mill. In one example of the invention, the weight ratio of the batch regolith and the metal balls put into the ball mill cylinder can be 1:5 and 1:15, the rotational speed of the cylinder can be 300-1500 rpm, the time of the operation can be 10-60 min.

Figure 2A:
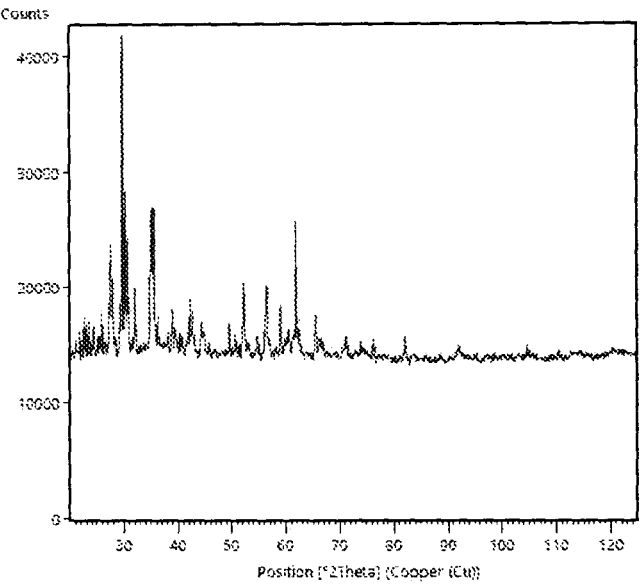
FIG. 2a illustrates a XRD diagram of the regolith sample before processing.

FIG. 2a illustrates a XRD diagram before the process of nano-production.

Figure 2B:
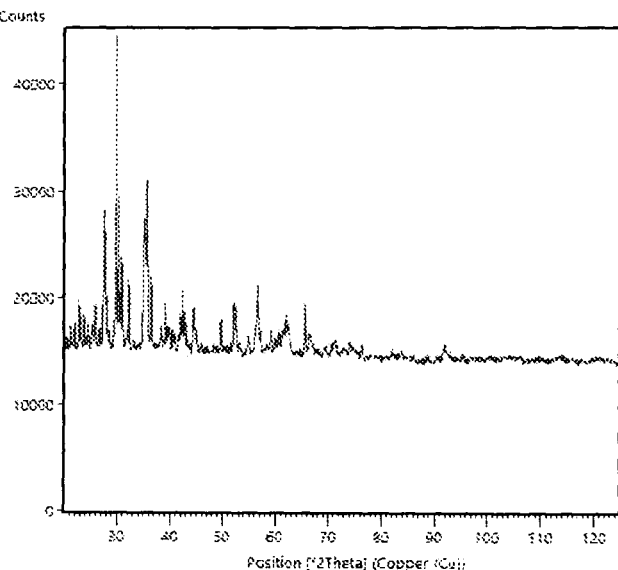
FIG. 2b illustrates a XRD diagram of the regolith sample after processing.

FIG. 2b illustrates a XRD diagram after the process of nano-production.

FIG. 2a and FIG. 2b show the results of the XRD test. The X-ray diffraction (XRD) is a versatile non-destructive analytical technique used to analyze physical properties such as phase composition, crystal structure and orientation of the powder, the solid and the liquid samples. These figures show the crystallographic structure of the regolith.

Figure 3A:
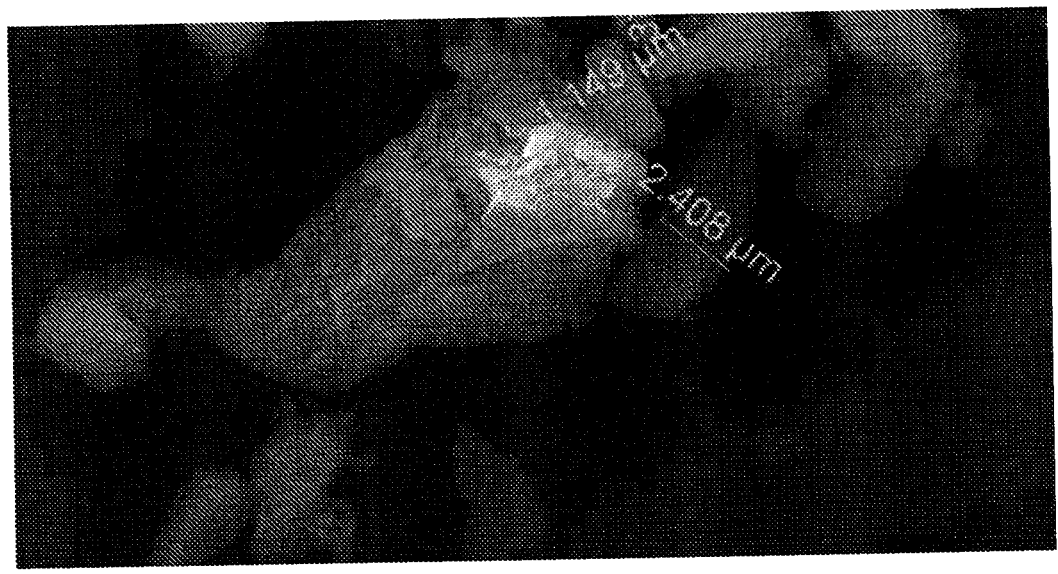
FIG. 3a illustrates field emission scanning electron microscopy (FE-SEM) image of the Micro-regolith particles.
Figure 3B:
FIG. 3b illustrates field emission scanning electron microscopy (FE-SEM) image of the Nano-regolith particles.

FIG. 3a and FIG. 3b show the results of the field emission scanning electron microscopy (FE-SEM) analysis.

In describing a preferred embodiment of the invention, specific terminology is resorted to for the sake of clarity. However, the invention is not intended to be limited to the specific terms so selected, and it is to be understood that each specific term includes all technical equivalents which operate in a similar manner to accomplish a similar purpose.

What is claimed is:

1. A method for production of a modified regolith powder, comprising the steps of: a) acquiring a batch regolith, b) forming the modified regolith powder with an average particle size of between 2 nm and 100 nm, wherein the step b) of forming the modified regolith powder is performed by grinding the batch regolith in a rotating ball mill, wherein the ball mill includes a plurality of mill balls, wherein the average particle size of the modified regolith powder produced in step c) is between 2 nm and 100 nm.

2. The method of claim 1, wherein the weight ratio of the batch regolith to the plurality of the mill balls is between 1:15 and 1:30 wt/wt.

3. The method of claim 1, wherein the ball mill is configured to rotate at a rotational speed between 600 rpm and 4200 rpm.

4. A method for production of a modified regolith suspension, comprising the steps of:

a) acquiring a batch regolith, b) forming the modified regolith powder with an average particle size of between 2 nm and 100 nm, wherein forming the modified regolith powder is performed by grinding the batch regolith in a rotating ball mill, wherein the ball mill includes a plurality of mill balls, wherein the average particle size of the modified regolith powder produced is between 2 nm and 100 nm, c) forming a suspension of the modified regolith powder, d) placing the suspension of the modified regolith powder in an ultrasonic liquid bath for 5-30 min to disperse the modified regolith powder for geochemical fractionation.

5. The method of claim 4, wherein the step c) of forming a suspension of the modified regolith powder includes forming the suspension of the modified regolith powder with a weight ratio of the modified regolith powder to the liquid between 1:100 wt/wt and 18:100 wt/wt.

6. The method of claim 4, wherein the step c) of forming the suspension of the modified regolith powder includes mixing the modified regolith powder and the liquid in an ultrasonic homogenizer.

7. The method of claim 4, wherein the modified regolith powder and the liquid is mixed in the ultrasonic homogenizer for the period of time between 10 minutes and 45 minutes.

8. The method of claim 4, wherein the liquid is a water.

9. The method of claim 4, wherein the liquid is a geopolymer.

* * * * *